Dec. 16, 1941.　　　L. S. HOBBS　　　2,266,320

ANTIFRICTION BEARING

Filed Aug. 2, 1938

INVENTOR
Leonard S. Hobbs
BY
Harris G. Luther
ATTORNEY

Patented Dec. 16, 1941

2,266,320

UNITED STATES PATENT OFFICE 2,266,320

ANTIFRICTION BEARING

Leonard S. Hobbs, West Hartford, Conn., assignor to United Aircraft Corporation, East Hartford, Conn., a corporation of Delaware Application August 2, 1938, Serial No. 222,679

15 Claims. (Cl. 29—149.5)

This invention relates to an improved antifriction bearing and an improved method of manufacturing the same and has particular reference to improvements in the construction and manufacture of the type of bearing generally designated as a plain bearing.

Some of the objects are to provide an improved plain bearing capable of withstanding bearing loads at high operating speeds over a relatively long period of time and to provide an improved method for economically and successfully producing uniform bearings of the character specified.

One of the objects of the invention is to effect an improvement upon the type of bearing disclosed in the patent application of Hobbs hereinafter more particularly referred to.

Another object is to provide a corrosion and erosion resistant bearing surface.

Another object is to provide a bearing surface composed of a mixture or alloy of metals, having desirable surface characteristics.

Other objects and advantages will be more particularly pointed out hereinafter or will become apparent as the description proceeds.

In the accompanying drawing, in which like reference numerals are used to designate similar parts throughout, there is illustrated an improved bearing constructed according to the invention and several stages in the method of producing such a bearing. The drawing, however, is for purposes of illustration only and is not to be taken as limiting the invention as it will be apparent to those skilled in the art that various changes in the form of bearing illustrated may be resorted to and that other and different steps than those illustrated may be utilized in the manufacturing process without in any way exceeding the scope of the invention.

In the drawing, Fig. 1 is a somewhat schematic elevational view of one-half of a bearing constructed according to the invention at an early stage in the manufacturing process.

Figure 1:
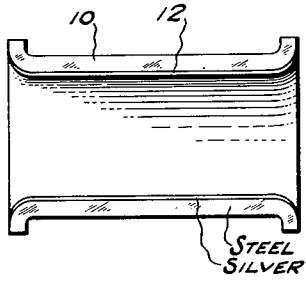
Figure 2:
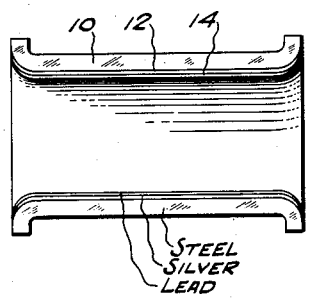
Fig. 2 is a view similar to Fig. 1 showing the bearing at a later stage in the manufacturing process.

While the various layers of material used to make up the bearing have been illustrated in the accompanying drawing, it is to be understood that the illustrations are diagrammatic and that the illustrated thicknesses of the various layers of material is for the purpose of illustration only and in no sense indicative of the actual thicknesses used in practice.

For convenience the invention will be hereinafter described in its application to a plain journal bearing, such as a main crankshaft bearing, or crankpin bearing for the crankshaft of an engine. It is to be understood, however, that the invention is not limited to this particular type of bearing but may be applied with equal facility to other forms of bearings.

Bearing material should have certain definite characteristics. It should be sufficiently hard and strong to withstand the heavy pressures and the pounding or hammering action incident to engine operation without significant distortion, it should have sufficient elasticity or malleability to conform to minor irregularities and misalignment of the shaft journal, it should have sufficient resiliency to avoid injury to the load contact area on the shaft journal, that is, it should give to a certain degree along the line of contact and not tend to flatten the shaft journal along this line, and should return constantly and immediately to its original shape, it should have a contact surface sufficiently soft so as not to scratch or wear the surface of the shaft journal and should also have a contact surface that has the best possible anti-friction and oil wetting characteristics.

With the above characteristics in mind I have produced a bearing by compounding various metals or alloys in layers of predetermined thickness and sequential order. In general, such a bearing structure may include a hard and rigid outer shell or backing member formed of steel or some other metal or alloy of comparable hardness and strength, an intermediate layer formed of a bearing metal softer than the steel backing member, bonded to the backing member, and a layer of a relatively soft and plastic metal having an excellent bearing surface but not necessarily any high degree of strength or resiliency.

The thickness of the intermediate layer will depend to some extent on the physical properties of the metal of which it is formed. It may be stated in a general way, that the thickness of the intermediate layer will be the minimum thickness necessary, considering the physical properties of the metal, to provide a cushion of sufficient resiliency between the steel backing member and the shaft journal or crankpin surface in order to avoid injury to the surface of the journal or crankpin.

The thickness of the inner layer will be the maximum thickness, having regard to the physical properties of the metal, in which it is possible to maintain the metal of the inner layer upon the inner surface of the intermediate layer without significant distortion by spreading, peeling, rolling or shearing.

A bearing comprising an intermediate layer of pure silver, from twenty to thirty thousandths of an inch in thickness, deposited onto and bonded to the inner surface of a conventional steel outer or backing member, and an inner layer of lead, of a thickness of one-thousandth to fifteen ten-thousandths of an inch, deposited on and bonded to the inner surface of the silver layer has been found to provide an entirely satisfactory construction for bearings of about three inches in diameter under some operating conditions. For a more detailed description of such a bearing reference is made to a patent application of Leonard S. Hobbs for Antifriction bearing, Serial No. 222,236, executed July 29, 1938, and filed July 30, 1938.

The following process and arrangement has been found to produce a bearing of the desired characteristics.

After the steel backing member 10 has been finished and thoroughly cleaned, the silver layer 12 is cast or molded or otherwise secured onto the inner surface of the backing member as is particularly shown in Fig. 1. The inner surface of the silver may, if desired, be roughened by a suitable operation, such as by sand blasting, to provide irregularities of extremely small magnitude. The roughened surface of the silver layer is then cleaned and degreased. After the degreasing a protective fixture is assembled upon the shell or backing member in a manner to cover all of the surface of the shell and expose only the bearing surface of the intermediate layer of bearing material. Before or after assembly of the protective fixture the bearing surface may be further cleaned and processed by washing it with an alkali solution, washing in cold water, and subjecting to a dipping process in a cyanide solution.

Lead is then plated, preferably by electroplating, onto the roughened silver surface to constitute a thin layer 14, as particularly shown. During the lead plating process the current density is carefully regulated to maintain the current density substantially constant and uniform under all conditions. The plating time is varied in order to obtain the desired amount of plating deposit in this operation.

When sufficient lead has been deposited, the bearing assembly is removed from the lead plating bath, thoroughly rinsed with cold water and the assembly is transferred to an indium plating bath for indium plating of the lead layer.

It is to be noted that in the case of cylindrical solid plain bearing this plating process may be conveniently and economically carried out by providing a different fixture which carries the anode and protects the ends of the cylindrical bearing structure, and then filling the interior of the bearing with the plating solution and applying the current between the anode and the lead layer through the backing shell or bearing retaining member such as the master rod or connecting rod. This method avoids the necessity of maintaining a large bath of the indium plating solution and the necessary tanks and other expensive equipment.

The plating time in the indium bath should be controlled to provide a deposit of approximately .5 to 5.0% by weight of the lead layer. After the indium plating operation is completed the protective fixture should be removed from the bearing and the bearing rinsed first in cold water and then in hot water and then thoroughly dried.

Figure 4:
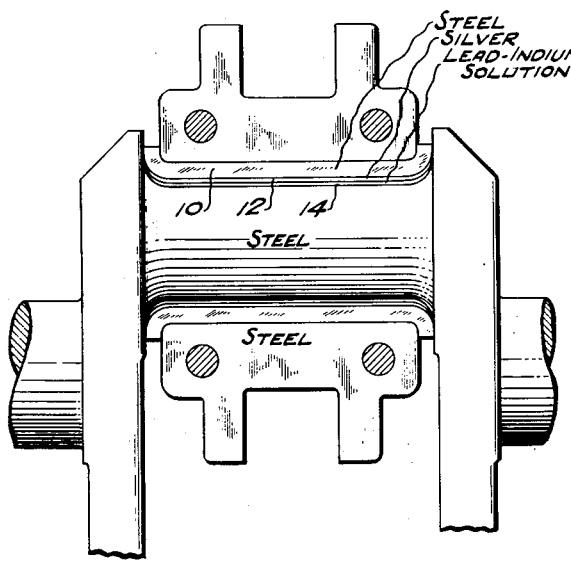
Fig. 4 is an elevational view of one-half of the finished bearing shown in connection with associated relatively rotatable machine elements.
Figure 3:
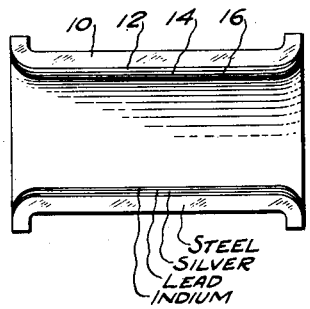
Fig. 3 is a view similar to Figs. 1 and 2 showing the bearing at a still later stage in the manufacturing process.

After the bearing has been dried there will be a very thin coating 16 of metallic indium on the inner surface of the lead layer as diagrammatically illustrated in Fig. 3. The bearing is then heated to a temperature somewhat above the melting point of indium and below the melting point of lead, a temperature of around 340 degrees Fahrenheit having been found satisfactory, and is maintained at that temperature until substantially all visual evidence of the indium plating has disappeared. It has been found that maintaining the indium plated bearing at a temperature around 340 degrees Fahrenheit for a period of approximately two hours is sufficient to cause the indium to impregnate the lead to produce a corrosion and erosion resisting alloy, or solid solution mixture, 14', as shown in Fig. 4, which still retains the excellent oil wetting and anti-friction qualities of a pure lead surface. The above described heating or baking step may be accomplished conveniently by baking the bearing in an oil bath of the specified temperature although other heating or baking processes may be used without in any way exceeding the scope of the invention. After removal from the hot oil bath and inspection the bearing is ready for service.

The heating or baking step may be dispensed with, in some cases, and the bearing put into service with the indium coating as the bearing surface. In this case the indium coating would also serve to fortify the lead against erosion and corrosion. The temperatures attained during operation, if sufficiently high, might, however, serve the same purpose as the baking and alloy the metals.

Although the indium may diffuse throughout the lead layer, the diffusion may not be uniform and there may be a greater concentration of the fortifying metal, i. e. indium, adjacent the bearing surface than adjacent the silver layer.

A finishing step involving smoothing or polishing the bearing surface may be employed if desired but it has been found that such a step is not necessary if the above described process is carefully controlled as indicated.

The above described process produces a bearing in which the intermediate layer, firmly bonded to the rigid shell or backing member, is capable of providing the necessary strength and resiliency for the bearing and a reasonably good bearing surface, particularly at local areas from which the thin inner plating may be removed in service, and in which the surface characteristics of the soft metal inner layer are maintained so that the inner surface of the bearing has the best obtainable anti-friction and oil wetting characteristics and at the same time the soft metal is fortified against corrosion and erosion to an extent that it does not materially depreciate over a long period of service.

While indium has been specifically mentioned as a desirable fortifying or impregnating medium for the metal of the soft inner layer it is altogether possible to use some other metal, having similar properties of forming a relatively erosion and corrosion resisting alloy, without in any way exceeding the scope of the invention.

The impregnated or alloyed bearing material may also be used as the bearing surface in other types of bearings.

Having now described the invention so that others skilled in the art may clearly understand the same, what it is desired to secure by Letters Patent is as follows:

1. The method of producing an anti-friction bearing which comprises, molding a layer of silver onto a steel backing member, roughening the surface of said silver layer, electroplating a thin layer of lead of sufficient thickness to cover all of the irregularities of the roughened surface of said silver layer onto said roughened surface, and electro-depositing a metallic ingredient onto the surface of said lead after said lead layer has been deposited to fortify said lead against erosion and corrosion during operation of said bearing.

2. The method of producing an anti-friction bearing which comprises, molding a layer of bearing metal containing at least fifty percent silver onto a steel backing member, roughening the surface of said layer, depositing a layer of lead onto the roughened surface of said first mentioned layer, and impregnating said lead layer with indium by electro-depositing a small quantity of indium onto the surface of said lead after said lead layer has been electro-deposited and then baking said bearing until the indium layer has been impregnated into the lead layer.

3. An anti-friction bearing comprising, a steel backing member, a layer of silver molded onto said steel backing member and provided with a roughened surface, a layer of lead electro-deposited onto the roughened surface of said silver layer, and an indium impregnation in said lead layer to fortify said lead against corrosion and erosion.

4. An anti-friction bearing comprising, a rigid backing member, and a coating of bearing metals on said backing member containing silver, and lead not in excess of ten percent of said silver content, and indium not in excess of ten percent of said lead content, arranged in layers, one of which consists of said lead and indium content and another of which contains essentially all of said silver content and is disposed between said lead-indium layer and said backing member.

5. The method of producing an anti-friction bearing which comprises, molding a layer of metal of intermediate hardness having comparatively good anti-friction characteristics onto a hard and rigid backing member to constitute the main body of bearing material of said bearing, electrodepositing a superficial layer of soft metal having anti-friction characteristics better than the anti-friction characteristics of said metal of intermediate hardness onto the friction surface of said layer of metal of intermediate hardness to constitute the wearing surface of said bearing, and impregnating said soft metal layer with a metallic ingredient of a character capable of fortifying said soft metal against erosion and corrosion.

6. The method of manufacturing an anti-friction bearing which comprises, molding a layer of a suitable bearing metal of a thickness sufficient to constitute said layer the main body of bearing material onto a metal backing member, roughening the exposed surface of said bearing metal, electroplating a thin coating of soft metal of a thickness not materially greater than the maximum depth of the irregularities provided on the surface of said first mentioned layer onto said roughened surface, electrolitically distributing a minute quantity of a fortifying metallic ingredient onto the surface of said soft metal layer, and diffusing said ingredient into said soft metal to fortify said soft metal against erosion and corrosion.

7. A method of producing an anti-friction bearing which comprises, molding a layer of substantially pure metal of good bearing characteristics to a substantially uniform thickness on the surface of a hard and rigid backing member, electrodepositing a superficial layer of substantially pure soft metal onto the bearing surface of said layer of bearing metal, electrolitically distributing a small quantity of a metallic fortifying ingredient over the surface of said soft metal layer, and diffusing said ingredient into said soft metal while maintaining said metal in layer form, to fortify said soft metal against erosion and corrosion.

8. The method of producing an anti-friction bearing which comprises, molding a layer of metal of intermediate hardness having comparatively good anti-friction characteristics onto a hard and rigid backing member to a thickness sufficient to constitute said layer the main body of bearing material, electrodepositing a layer of soft metal to a thickness not greater than one-fifth the thickness of said first mentioned layer onto the surface of said layer of intermediate hardness to provide a wearing surface of good oil wetting characteristics for said bearing, electrodepositing a metallic ingredient onto the surface of said soft metal after said soft metal layer has been formed, and then heat treating said bearing to diffuse said metallic ingredient into said soft metal to fortify said soft metal against erosion and corrosion.

9. The method of producing a bearing which comprises, coating a backing member with a layer of bearing material of sufficient thickness to provide the necessary resiliency for said bearing, coating said bearing material with a thin layer of a softer bearing material to provide a rubbing surface of good oil wetting characteristics for said bearing, and then diffusing a minute quantity of a fortifying metal into the surface of said layer of softer bearing material while maintaining said soft material in layer form to fortify said soft material against erosion and corrosion.

10. The method of producing a machine bearing which includes the step of electrodepositing a thin layer of a substantially pure soft metal onto the bearing surface, electrolitically distributing a small quantity of a metallic fortifying ingredient over the surface of said soft metal layer, and then diffusing said ingredient into said soft metal.

11. An anti-friction bearing comprising, a hollow cylindrical body of one or more parts in which the outer portion of each part comprises a relatively hard and rigid backing portion, and the inner portion comprises a relatively soft readily deformable layer of bearing material of a thickness not exceeding five-thousandths of an inch carried by an intermediate layer of metal of medium hardness, said intermediate layer having a thickness of at least ten-thousandths of an inch, and a quantity of a fortifying metallic ingredient not exceeding one-twentieth of the quantity of soft metal in said inner portion diffused into the soft metal of said inner portion.

12. An anti-friction bearing comprising, a rigid backing member, and a coating of bearing metal on said backing member containing silver, lead and indium, said silver and lead being arranged in heterogeneous layers in which the respective metals predominate with the silver layer between the lead layer and the backing member, and in which the lead content of the coating does not exceed ten percent of the silver content, the indium being totally included in the layer in which lead predominates and not exceeding five percent of the lead content of said bearing.

13. An anti-friction bearing comprising, a relatively rigid backing member formed of a hard metallic composition and shaped to surround at least a portion of a rotatable journal with a substantially uniform space between the journal facing surface thereof and the surface of said journal, a solid layer of bearing metal of intermediate mechanical strength and of good anti-friction characteristics secured to said backing member and substantially filling the space between said backing member and said journal, a superficial coating of a metal of low mechanical strength and excellent anti-friction characteristics on the journal facing surface of said first mentioned layer, and a minute quantity of fortifying metallic ingredient in said metal of low mechanical strength.

14. The method of producing an anti-friction bearing which comprises, molding a layer of bearing metal containing at least fifty percent silver onto a backing member, depositing a layer of lead onto the exposed surface of said first mentioned layer, and impregnating said lead layer with indium by electrodepositing a small quantity of indium onto the surface of said lead after said layer has been electrodeposited, and then baking said bearing until the indium layer has been impregnated into the lead layer.

15. An anti-friction bearing comprising a relatively rigid backing member formed of steel and shaped to surround at least a portion of a rotatable journal with a substantially uniform space between the journal facing surface thereof and the surface of said journal, a solid layer of silver secured to said backing member and substantially filling the space between said backing member and said journal, a superficial coating of lead on the journal facing surfaced of said silver layer, and a minute quantity of indium in said lead layer.

LEONARD S. HOBBS.